United States Patent
Dueñas Fernández et al.

(10) Patent No.: US 10,922,705 B1
(45) Date of Patent: Feb. 16, 2021

(54) YIELD MANAGEMENT THROUGH THE CLASSIFICATION OF RENDERABLE DATA OBJECTS

(71) Applicant: GROUPON, INC., Chicago, IL (US)

(72) Inventors: Rodrigo Alfonso Dueñas Fernández, Palo Alto, CA (US); Samantha Perkins, Mountain View, CA (US)

(73) Assignee: Groupon, Inc., Chicago, IL (US)

(*) Notice: Subject to any disclaimer, the term of this patent is extended or adjusted under 35 U.S.C. 154(b) by 146 days.

(21) Appl. No.: 16/124,271

(22) Filed: Sep. 7, 2018

Related U.S. Application Data

(60) Provisional application No. 62/555,383, filed on Sep. 7, 2017.

(51) Int. Cl.
| | |
|---|---|
| *G06Q 30/02* | (2012.01) |
| *G06F 16/28* | (2019.01) |
| *G06Q 10/06* | (2012.01) |
| *G06Q 10/08* | (2012.01) |
| *G06F 9/451* | (2018.01) |

(52) U.S. Cl.
CPC ......... *G06Q 30/0211* (2013.01); *G06F 9/451* (2018.02); *G06F 16/285* (2019.01); *G06Q 10/06315* (2013.01); *G06Q 10/087* (2013.01); *G06Q 30/0223* (2013.01)

(58) Field of Classification Search
USPC .............................................. 705/14.66; 1/1
See application file for complete search history.

(56) References Cited

U.S. PATENT DOCUMENTS

| | | | |
|---|---|---|---|
| 8,355,948 B2 | 1/2013 | Mason | |
| 8,732,040 B1* | 5/2014 | Prabhune | G06Q 20/203 |
| | | | 705/22 |
| 2011/0258049 A1* | 10/2011 | Ramer | G06Q 30/02 |
| | | | 705/14.66 |

OTHER PUBLICATIONS

U.S. Appl. No. 14/755,742, filed Jun. 30, 2015, In re: Lai et al. entitled Method, Apparatus, and Computer Program Product for Facilitating Dynamic Change of an Adjustable Component of a Data Set, U.S. Appl. No. 14/755,742.

U.S. Appl. No. 13/839,360, filed Mar. 15, 2013, In re: Chang et al. entitled Dynamic Promotion Analytics, U.S. Appl. No. 13/839,360.

(Continued)

*Primary Examiner* — Afaf Osman Bilal Ahmed
(74) *Attorney, Agent, or Firm* — Alston & Bird LLP

(57) ABSTRACT

A method, apparatus and computer program products are provided for providing, simultaneously, a first dynamic user interface to a first device and a second dynamic user interface to a second device, the first dynamic user interface being different from the second dynamic user interface, wherein input at the first dynamic user interface causes real-time updating of the second dynamic user interface. One example method includes providing, via the first dynamic user interface of the first device, a set of data objects, each associated with an adjustable parameter, receiving input, at the first device, indicative of the adjustable parameter and a first data element, providing to the second device, via the second dynamic user interface, a subset of the set of data objects and the first data element, the first data element configured to display a particular characteristic of an associated member of the set of data objects.

30 Claims, 7 Drawing Sheets

(56) References Cited

OTHER PUBLICATIONS

U.S. Appl. No. 13/829,581, filed Mar. 14, 2013, In re: Aggarwal et al. entitled Promotion Offering System, U.S. Appl. No. 13/829,581.
U.S. Appl. No. 13/411,502, filed Mar. 2, 2012, In re: O'Brien et al. entitled Relevance System for Consumer Deals, U.S. Appl. No. 13/411,502.

* cited by examiner

Redemption Locations

Select All / Unselect All
- ☑ 10 N Evergreen Road, Spokane Valley, WA, 99216, US
- ☑ 12505 E Sprague, Spokane Valley, WA, 99216, US
- ☑ Park Blvd, Palo Alto, CA, 94306, US
- ☐ 191 Park Avenue, Palo Alto, CA, 94306, US
- ☐ chennai, california, chennai, 6000031, IN

Select Service Categories and Maximum Discounts

- ☑ Hair — Up to 10% Off
- ☑ Nails — Up to 55% Off
- ☐ Massages — Set the max discount for this service
- ☐ Face & Skin — Set the max discount for this service
- ☐ Brow & Lash — Set the max discount for this service
- ☑ Blowouts & Styling — Up to 40% Off
- ☐ Tanning — Set the max discount for this service
- ☐ Hair Removal — Set the max discount for this service
- ☐ Makeup — Set the max discount for this service

FIG. 5A

Peak Hours

Select the time blocks that represent the merchant's busiest ("peak") hours. Unselected blocks will be designated "off-peak" for margin purposes

|  | MON | TUE | WED | THU | FRI | SAT | SUN |
|---|---|---|---|---|---|---|---|
| MORNINGS (OPEN-12) | Peak | | | | | | |
| MID-DAY (12-2PM) | | Peak | Peak | Peak | Peak | Peak | Peak |
| AFTERNOON (2-5PM) | | Peak | Peak | | Peak | | Peak |
| EVENING (5-CLOSE) | | | | | | | |

Margins

Set the Marketing Free for each category below. Repeat Customers include those who have made an appointment at this business on Groupon within the past 6 months.

|  | Peak Hours | Off-Peak Hours |
|---|---|---|
| New Customers : | 8.34 % | 8.34 % |
| Repeat Customers : | 10.45 % | 10.46 % |

Service Fee

Enter the service fee you negotiated with the merchant (promotional fee+credit card fee).

FIG. 5B

YIELD MANAGEMENT THROUGH THE CLASSIFICATION OF RENDERABLE DATA OBJECTS

CROSS-REFERENCE TO RELATED APPLICATIONS

The present application claims priority to provisional patent application No. 62/555,383 filed on Sep. 7, 2017, the content of which is incorporated herein by reference in its entirety.

TECHNOLOGICAL FIELD

Embodiments of the invention relate, generally, to yield management through the classification of renderable data objects, and in particular, to programmatically facilitating the maximization of available capacity through the reception and provision of variable and dynamic data elements.

BACKGROUND

The applicant has discovered problems with current methods, systems, and apparatuses for facilitating location-based and/or boundary based access to device-linked instruments and delivery thereof. Through applied effort, ingenuity, and innovation, Applicant has solved many of these identified problems by developing a solution that is embodied by the present invention, which is described in detail below.

BRIEF SUMMARY

In general, embodiments of the present invention provided herein include systems, methods, apparatuses, and computer readable media for providing a first dynamic user interface to a first device and a second dynamic user interface to a second device, the first dynamic user interface being different from the second dynamic user interface, and wherein input at the first dynamic user interface causes updating of the second dynamic user interface. Some embodiments provide, more specifically, to a system, method, apparatus, and computer program product for providing a first dynamic user interface, displaying renderable data objects and subsequently classifying the renderable data objects with a first data element. Embodiments described herein may also provide for subsequently providing a second dynamic user interface at a second device, to display a subset of the renderable data objects and a renderable characteristic of each member of the set of renderable data objects before then receiving selection.

Other systems, methods, and features will be, or will become, apparent to one with skill in the art upon examination of the following figures and detailed description. It is intended that all such additional systems, methods, features to be included within this description, be within the scope of the disclosure, and be protected by the following claims.

In some embodiments, an apparatus may be provided for providing, simultaneously, a first dynamic user interface to a first device and a second dynamic user interface to a second device, the first dynamic user interface being different from the second dynamic user interface, wherein input at the first dynamic user interface causes real-time updating of the second dynamic user interface, the apparatus comprising at least one processor and at least one memory including computer program code, the at least one memory and the computer program code configured to, with the processor, cause the apparatus to at least: provide, via the first dynamic user interface of the first device, a set of renderable data objects, each member of the set of renderable data objects associated with an adjustable parameter; receive input, at the first device via the dynamic user interface, of data indicative of the adjustable parameter and a first data element for each member of the set of renderable data objects, the first data element indicative of a renderable characteristic of each member of the set of renderable data objects; provide to the second device, via the second dynamic user interface, a subset of the set of renderable data objects and the first data element associated with each member of the subset of the set of renderable data objects, wherein the first data element is configured to display a particular characteristic of an associated member of the set of renderable data objects; and receive a data signal indicative of user input at the second dynamic user interface indicative of a selection of a particular member of the set of renderable data objects.

In some embodiments, the at least one memory and the computer program code are further configured to, with the processor, cause the apparatus to: receive input, from the second device, at the second dynamic user interface, indicative of a request preceding the provision of the set of renderable data objects.

In some embodiments, the at least one memory and the computer program code are further configured to, with the processor, cause the apparatus to: programmatically, and in real-time, update at least one of the set of renderable data objects and the first data element.

In some embodiments, the at least one memory and the computer program code are further configured to, with the processor, cause the apparatus to: receive input, at the first device via the dynamic user interface, of one or more additional data elements including at least a second data element for each member of the set of renderable data objects, the second data element indicative of a renderable characteristic of each member of the set of renderable data objects; subsequent to receiving the signal indicative of the selection, decrement the second data element; and upon receiving a second request, determine whether an update is required before providing the set of renderable data objects.

In some embodiments, each member of the set of renderable data objects is configured to be modified, via input to the first dynamic user interface, resulting in a modification of the set of adjustable parameters of the set of renderable data objects and a view of the set of renderable data objects;

In some embodiments, the at least one memory and the computer program code are further configured to, with the processor, cause the apparatus to, based on where the set of renderable data objects end up at, store the set of parameters in a database; and access the database for the parameters in order to generate the second set of renderable data objects.

In some embodiments, the at least one memory and the computer program code are further configured to, with the processor, cause the apparatus to: provide a first subset of renderable data objects upon selection of the particular renderable data object, each element of the first subset of renderable data objects representative of a type of service able to be requested by the user.

In some embodiments, the at least one memory and the computer program code are further configured to, with the processor, cause the apparatus to: check for available service provided be the service provider, and for each service, a quantity available for the particular selected timeframe; and provide a first subset of renderable data objects upon selection of the particular renderable data object, each element of the first subset of renderable data objects representative of a type of service able to be requested by the user (e.g., haircut, pedicure, etc.).

In some embodiments, the received input indicative of the request comprises location information.

In some embodiments, the at least one memory and the computer program code are further configured to, with the processor, cause the apparatus to: programmatically determine an initial value for the first data element by applying a classification algorithm, the classification algorithm generated via an unsupervised learning process using values assigned to one or data elements associated with previous rendered data objects.

In some embodiments, the providing of the first dynamic user interface to the first device and the second dynamic user interface to the second device occurs simultaneously, input at the first dynamic user interface causes real-time updating of the second dynamic user interface, and input at the second dynamic user interface causes real-time updating of the first dynamic user interface.

In some embodiments, a computer program product may be provided for providing, simultaneously, a first dynamic user interface to a first device and a second dynamic user interface to a second device, the first dynamic user interface being different from the second dynamic user interface, wherein input at the first dynamic user interface causes real-time updating of the second dynamic user interface, the computer program product comprising at least one non-transitory computer-readable storage medium having computer-executable program code instructions stored therein, the computer-executable program code instructions comprising program code instructions for: providing, via the first dynamic user interface of the first device, a set of renderable data objects, each member of the set of renderable data objects associated with an adjustable parameter; receiving input, at the first device via the dynamic user interface, of data indicative of the adjustable parameter and a first data element for each member of the set of renderable data objects, the first data element indicative of a renderable characteristic of each member of the set of renderable data objects; providing to the second device, via the second dynamic user interface, a subset of the set of renderable data objects and the first data element associated with each member of the subset of the set of renderable data objects, wherein the first data element is configured to display a particular characteristic of an associated member of the set of renderable data objects; and receiving a data signal indicative of user input at the second dynamic user interface indicative of a selection of a particular member of the set of renderable data objects.

In some embodiments, the computer-executable program code instructions further comprise program code instructions for: receiving input, from the second device, at the second dynamic user interface, indicative of a request preceding the provision of the set of renderable data objects.

In some embodiments, the computer-executable program code instructions further comprise program code instructions for: programmatically, and in real-time, updating at least one of the set of renderable data objects and the first data element.

In some embodiments, the computer-executable program code instructions further comprise program code instructions for: receiving input, at the first device via the dynamic user interface, of one or more additional data elements including at least a second data element for each member of the set of renderable data objects, the second data element indicative of a renderable characteristic of each member of the set of renderable data objects; subsequent to receiving the signal indicative of the selection, decrementing the second data element; and upon receiving a second request, determining whether an update is required before providing the set of renderable data objects.

In some embodiments, wherein each member of the set of renderable data objects is configured to be modified, via input to the first dynamic user interface, resulting in a modification of the set of adjustable parameters of the set of renderable data objects and a view of the set of renderable data objects; wherein the computer-executable program code instructions further comprise program code instructions for, based on where the set of renderable data objects end up at, storing the set of parameters in a database; and accessing the database for the parameters in order to generate the second set of renderable data objects.

In some embodiments, the computer-executable program code instructions further comprise program code instructions for: providing a first subset of renderable data objects upon selection of the particular renderable data object, each element of the first subset of renderable data objects representative of a type of service able to be requested by the user (e.g., haircut, pedicure, etc.)

In some embodiments, the computer-executable program code instructions further comprise program code instructions for: checking for available service provided be the service provider, and for each service, a quantity available for the particular selected timeframe; and providing a first subset of renderable data objects upon selection of the particular renderable data object, each element of the first subset of renderable data objects representative of a type of service able to be requested by the user.

In some embodiments, the received input indicative of the request comprises location information.

In some embodiments, the computer-executable program code instructions further comprise program code instructions for: programmatically determining an initial value for the first data element by applying a classification algorithm, the classification algorithm generated via an unsupervised learning process using values assigned to one or data elements associated with previous rendered data objects.

In some embodiments, the providing of the first dynamic user interface to the first device and the second dynamic user interface to the second device occurs simultaneously, input at the first dynamic user interface causes real-time updating of the second dynamic user interface, and input at the second dynamic user interface causes real-time updating of the first dynamic user interface.

In some embodiments, a method may be provided for providing, simultaneously, a first dynamic user interface to a first device and a second dynamic user interface to a second device, the first dynamic user interface being different from the second dynamic user interface, wherein input at the first dynamic user interface causes real-time updating of the second dynamic user interface, the method comprising: providing, via the first dynamic user interface of the first device, a set of renderable data objects, each member of the set of renderable data objects associated with an adjustable parameter; receiving input, at the first device via the dynamic user interface, of data indicative of the adjustable parameter and a first data element for each member of the set of renderable data objects, the first data element indicative of a renderable characteristic of each member of the set of renderable data objects; providing to the second device, via the second dynamic user interface, a subset of the set of renderable data objects and the first data element associated with each member of the subset of the set of renderable data objects, wherein the first data element is configured to display a particular characteristic of an associated member of the set of renderable data objects; and receiving a data signal indicative of user input at the second dynamic user interface indicative of a selection of a particular member of the set of renderable data objects.

In some embodiments, the method may further comprise receiving input, from the second device, at the second dynamic user interface, indicative of a request preceding the provision of the set of renderable data objects.

In some embodiments, the method may further comprise programmatically, and in real-time, updating at least one of the set of renderable data objects and the first data element.

In some embodiments, the method may further comprise receiving input, at the first device via the dynamic user interface, of one or more additional data elements including at least a second data element for each member of the set of renderable data objects, the second data element indicative of a renderable characteristic of each member of the set of renderable data objects; subsequent to receiving the signal indicative of the selection, decrementing the second data element; and upon receiving a second request, determining whether an update is required before providing the set of renderable data objects.

In some embodiments, each member of the set of renderable data objects is configured to be modified, via input to the first dynamic user interface, resulting in a modification of the set of adjustable parameters of the set of renderable data objects and a view of the set of renderable data objects. In some embodiments, the method may further comprise, based on where the set of renderable data objects end up at, storing the set of parameters in a database; and accessing the database for the parameters in order to generate the second set of renderable data objects.

In some embodiments, the method may further comprise providing a first subset of renderable data objects upon selection of the particular renderable data object, each element of the first subset of renderable data objects representative of a type of service able to be requested by the user (e.g., haircut, pedicure, etc.).

In some embodiments, the method may further comprise checking for available service provided be the service provider, and for each service, a quantity available for the particular selected timeframe; and providing a first subset of renderable data objects upon selection of the particular renderable data object, each element of the first subset of renderable data objects representative of a type of service able to be requested by the user.

In some embodiments, the received input indicative of the request comprises location information.

In some embodiments, the method may further comprise programmatically determining an initial value for the first data element by applying a classification algorithm, the classification algorithm generated via an unsupervised learning process using values assigned to one or data elements associated with previous rendered data objects.

In some embodiments, the providing of the first dynamic user interface to the first device and the second dynamic user interface to the second device occurs simultaneously, input at the first dynamic user interface causes real-time updating of the second dynamic user interface, and input at the second dynamic user interface causes real-time updating of the first dynamic user interface.

BRIEF DESCRIPTION OF THE SEVERAL VIEWS OF THE DRAWINGS

Figure 1:
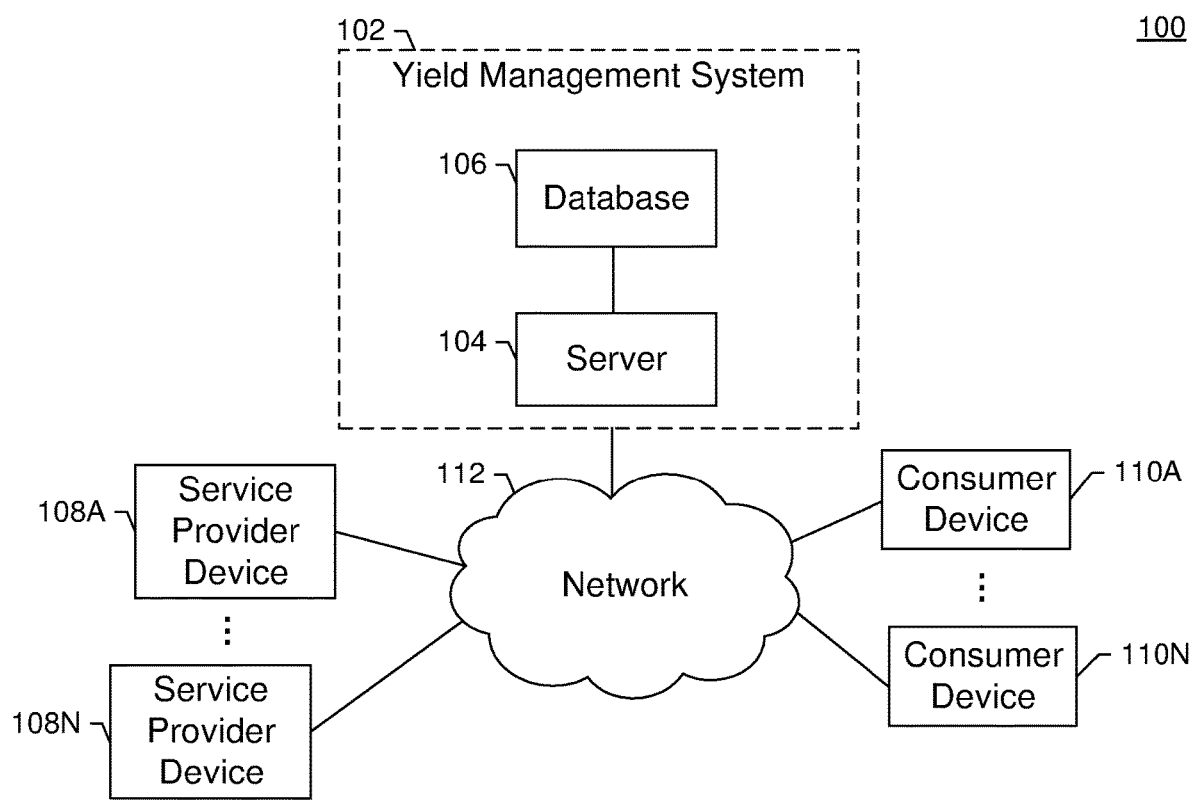

Having thus described embodiments of the invention in general terms, reference will now be made to the accompanying drawings, which are not necessarily drawn to scale, and wherein:

FIG. 1 shows an example system within which embodiments of the present invention may operate.

Figure 2:
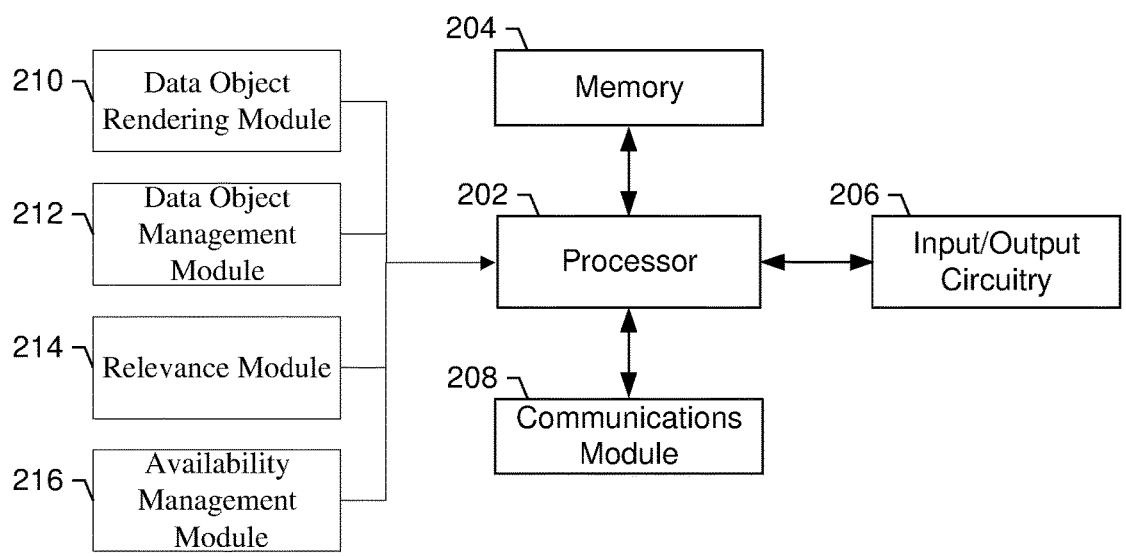

FIG. 2 shows a block diagram showing an example device for facilitating location-based and/or boundary based access to device-linked instruments and delivery thereof, using special-purpose circuitry in accordance with some exemplary embodiments of the present invention.

Figure 3:
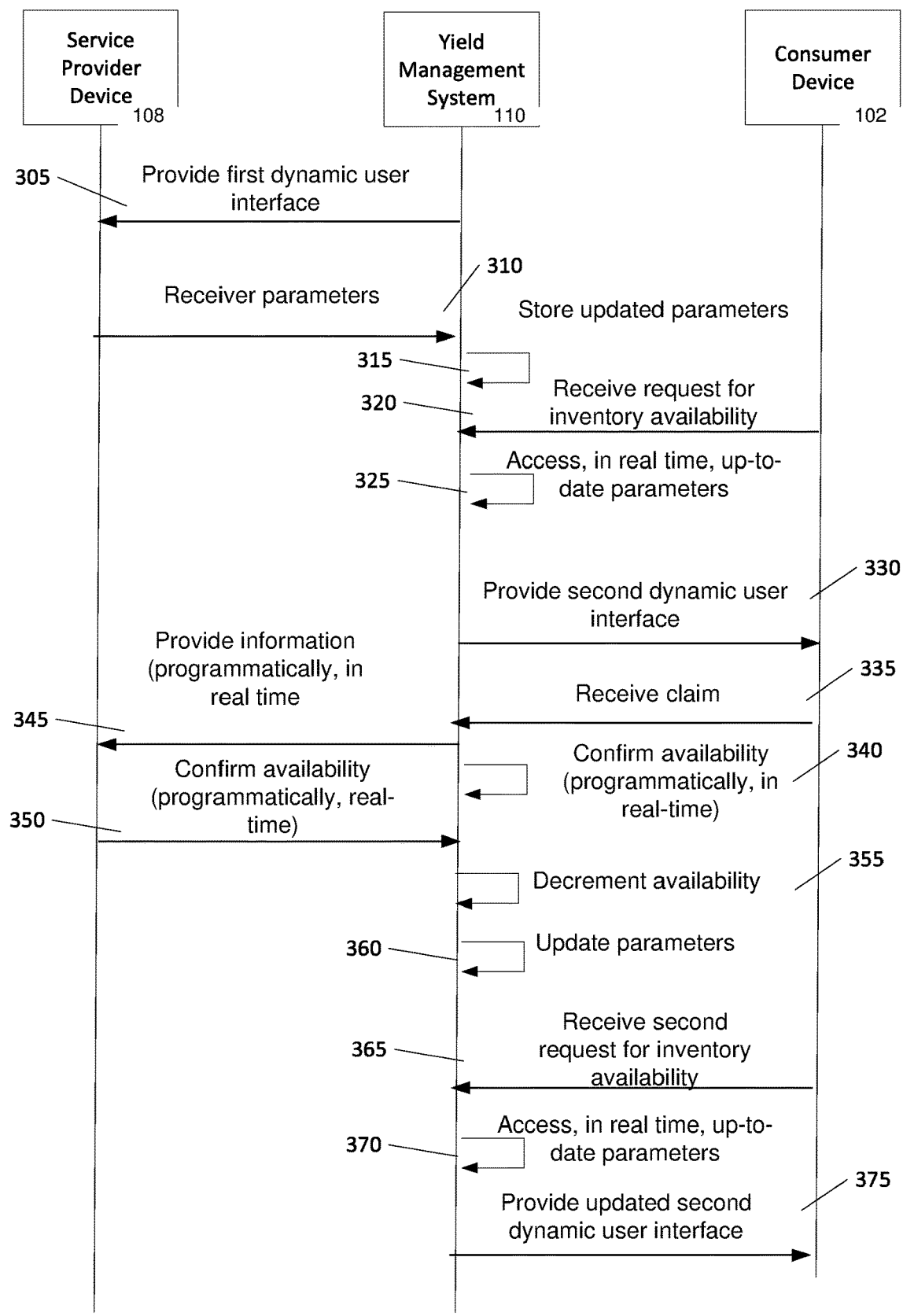

FIG. 3 shows a data flow diagram depicting data flow operations in accordance with some example embodiments discussed herein.

Figure 4:
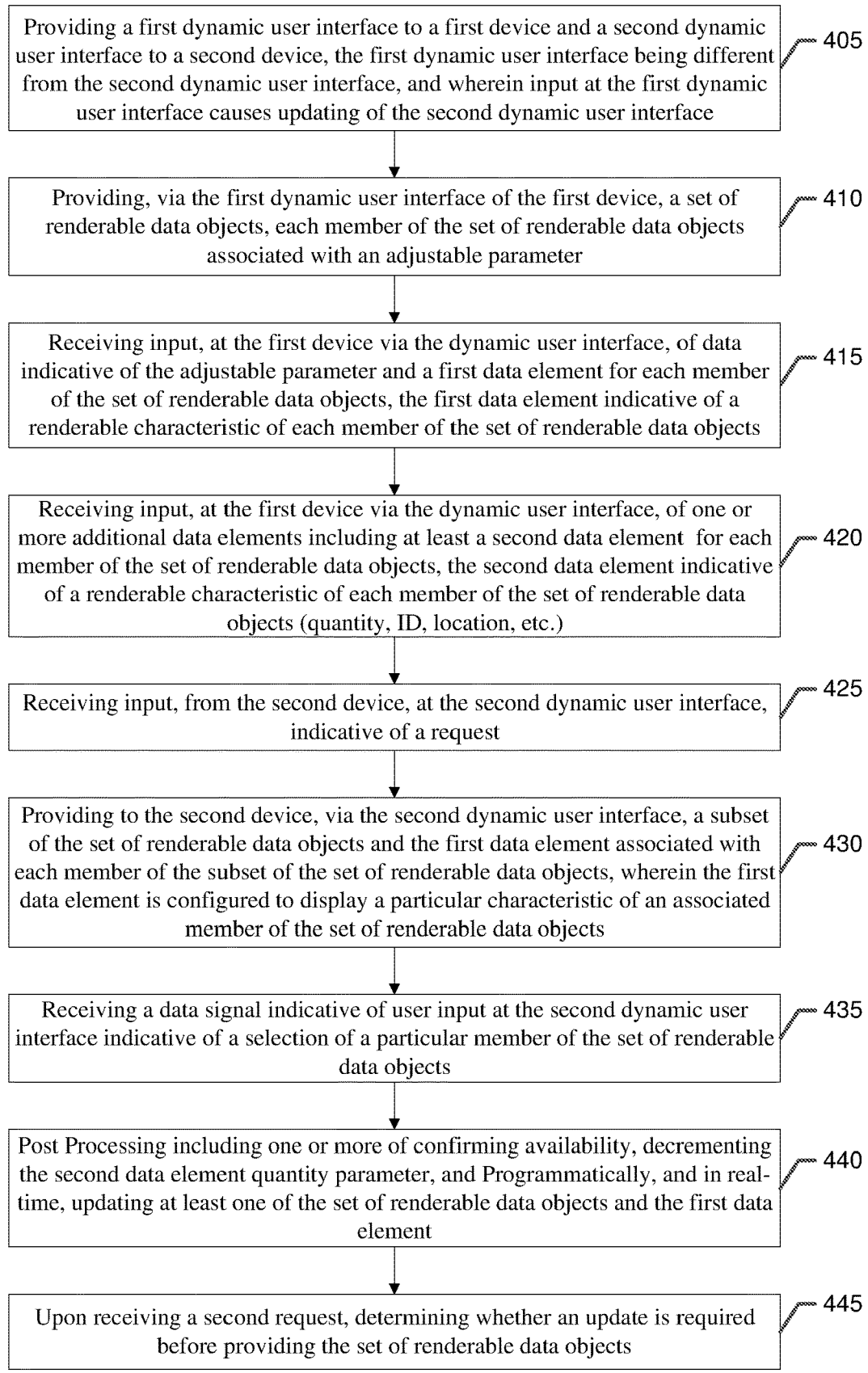

FIG. 4 shows a flowchart depicting example operations for programmatically to facilitating the maximization of available capacity through the use of variable and dynamic data elements, in accordance with some example embodiments discussed herein.

Figure 5C:
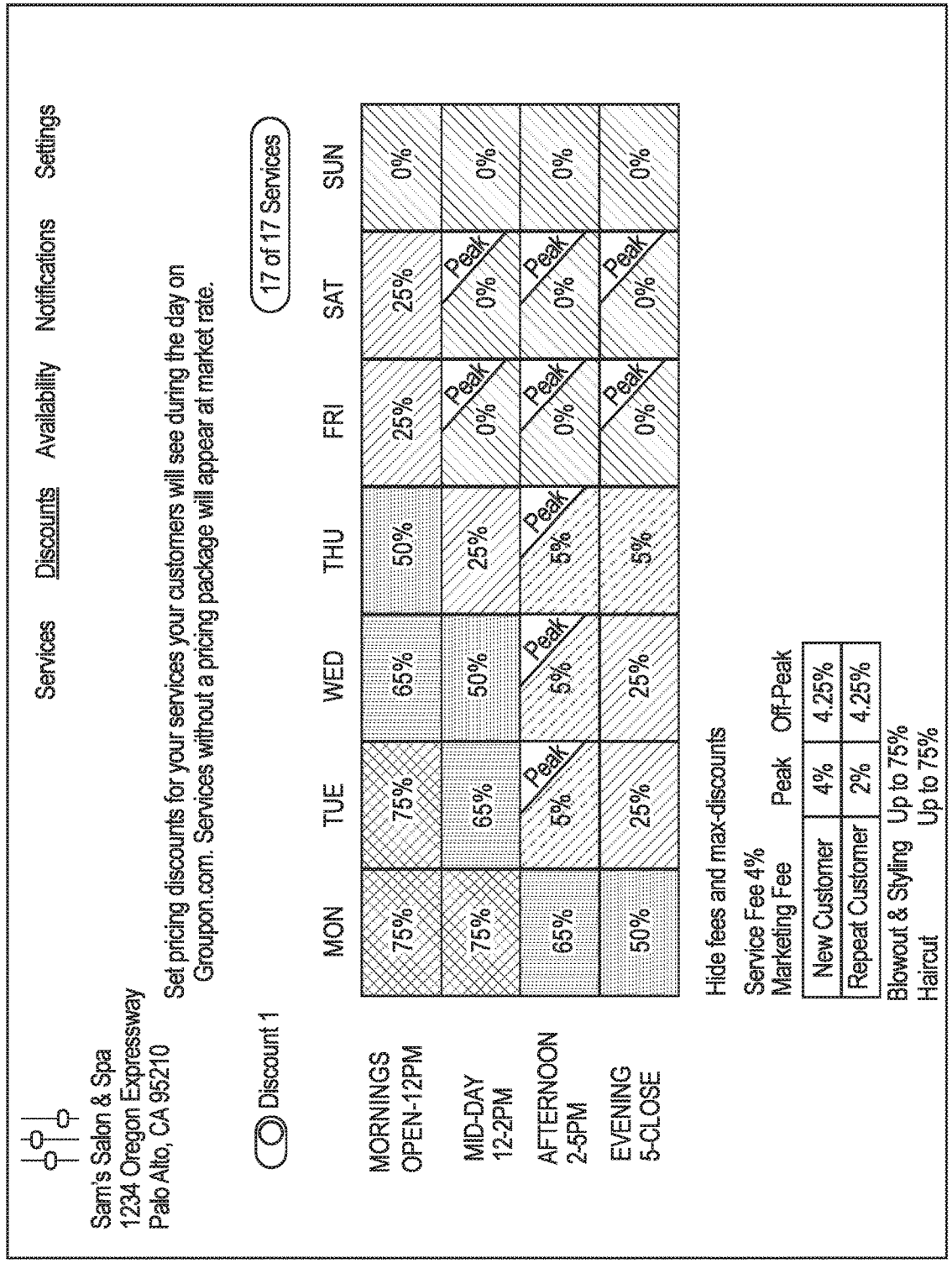

FIGS. 5A, 5B, and 5C show user interfaces depicting exemplary embodiments for to programmatically facilitating the maximization of available capacity through the use of variable and dynamic data elements, in accordance with some embodiments of the present invention.

DETAILED DESCRIPTION

Embodiments of the present invention now will be described more fully hereinafter with reference to the accompanying drawings, in which some, but not all embodiments of the inventions are shown. Indeed, embodiments of the invention may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, and/or the like.

Overview

Various embodiments of the present invention are directed to improved systems, apparatuses, methods, and computer readable media for programmatically facilitating the maximization of available capacity through the use of variable and dynamic data elements. In particular, the various embodiments are directed to providing a first dynamic user interface to a first device and a second dynamic user interface to a second device, the first dynamic user interface being different from the second dynamic user interface, for example, because the first dynamic user interface is configured for use by a service provider to identify various time segments (e.g., adjustable parameters of the renderable data objects) and an associated discount level (e.g., a first data element) as well as, in some embodiments, a quantity or the like. In this regard, embodiments of the present invention provide systems, devices, methods, and computer readable media directed to enabling input and/or modification of the set of renderable data objects at the first dynamic user interface and the subsequent provision, updating of, or changing of at least a subset of a set of renderable data objects and an associated first data element programmatically, and in real-time, at the second dynamic user interface.

In a first use case, embodiments described herein enable a service provider to assign a discount level to a particular time period and subsequently provide this information to a consumer, for example, viewing those time segments, on a user interface of a user device, allowing selection of a particular time segment knowing the associated discount level.

Further embodiments described herein provide a system that enables a service provider (e.g., a merchant who provides one or more services to consumers) to segment time (e.g., a day, a week, a month) into one or more time segments (e.g., hourly) and assign a general classifier (e.g., peak, off-peak), or a specific classifier (e.g., market rate, 10%, 25%, 50%, etc.) to each of the one or more segments indicative of a discount.

The system may further enable the service provider to identify a capacity, inventory, or general availability or the like for each of one or more services at any given time (e.g., on a per time segment basis). The system then, in response, to a request from a consumer, provides a dynamic user interface, via for example, an app running on a user's mobile phone or the like, programmatically displaying a real-time availability and price or discount level of each of the one or more services that may be provided by and received by the consumer. Upon a claim by the consumer (e.g., requesting or making an appointment for one or more services), the system programmatically, and in real-time, updates the inventory or capacity of the one or more services and in some embodiments, of one or more other services affected (e.g., a consumer making an appointment for a swedish reduces the chairs available at a service provider reducing not only the number of Swedish massages available at a certain time, but also the number of deep-tissue massages, etc.)

Definitions

As used herein, the term "service provider" may include, but is not limited to, a business owner, consigner, shopkeeper, tradesperson, vendor, provider, operator, entrepreneur, agent, dealer, organization or the like that is in the business of a providing a good, service or experience to a consumer, facilitating the provision of a good, service or experience to a consumer and/or otherwise operating in the stream of commerce. One example service provider may be a salon that provides, for example, haircuts, and the like. As described herein, a service provider operates a first device, which may be, for example, a device, a system of devices or a module operated, for example, by the service provider. Often service providers operate devices capable of processing or communicating data in relation to a payment, such as a point-of-sale ("POS") machine, a mobile payment processing system, a cellular phone, a laptop, any intermediary device that could communicate with a POS machine, or the like.

As used herein, the term "consumer" may include, but is not limited to, a client, customer, purchaser, shopper, user, or the like, who may be in the position to or does exchange value for one or more services. For example, and using the aforementioned salon as the example service provider, a consumer may be an individual who is interested in getting a haircut and/or gets a haircut. As used herein, the term "second device" describes a mobile device configured to execute an app provided by, navigate to a webpage provided by or otherwise interact with the system described herein. Examples of a second device may include a laptop, mobile device (e.g., smartphones and other mobile devices), tablet, personal computer, or combination of any of the above, or the like.

As used herein, the term "database" may refer to any organized collection of data. A database, as referred to herein, is organized such that information may be accessed via a query (e.g., the location of each of a plurality of consumers or merchants may be organized such that each consumer in a particular location may be queried).

Technical Underpinnings and Implementation of Exemplary Embodiments

Variable and dynamic discount levels allow the optimization of available capacity. While some solutions do exist in specific market segments (e.g., dining, airline travel), several limitations preclude their mainstream use. For instance, none provide the granularity necessary to accommodate the varying services provided by a service provider. That is, in dining, each consumer receives the same service and in airline travel, each consumer is limited to the same reservation time. Moreover, none allow the real-time, immediate feedback, in the changing capacity across multiple services. As such, the use of such technologies by or for, for example, a service provider is too broad, non-specific, and slow to be effective. Hence there exists a need for an improved system for facilitating the maximization of available capacity.

System Architecture

Methods, apparatuses, and computer program products of the present invention may be embodied by any of a variety of devices. For example, the method, apparatus, and computer program product of an example embodiment may be embodied by a networked device, such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile terminals, such as a mobile telephone, smartphone, laptop computer, tablet computer, or any combination of the aforementioned devices.

In this regard, FIG. 1 discloses an example computing system within which embodiments of the present invention may operate.

Service providers and consumers alike may access a yield management system 102 via a network 112 (e.g., the Internet, or the like) using computing devices 108A through 108N and 110A through 110N, respectively (e.g., one or more service provider devices 108A-108N or one or more consumer devices 110A-110N). The yield management system 102 may function to provide a merchant intelligence platform as described herein and below. Moreover, the yield management system 102 may comprise a server 104 in communication with a database 106.

The server 104 may be embodied as a computer or computers as known in the art. The server 104 may provide for receiving of electronic data from various sources, including but not necessarily limited to the service provider devices 108A-108N and the consumer devices 110A-110N. For example, the server 104 may be operable to receive and process data provided by the service provider devices 108A-108N and the consumer devices 110A-110N. The server 104 may also facilitate e-commerce transactions based on transaction information provided by the service provider devices 108A-108N and the consumer devices 110A-110N. The server 104 may facilitate the generation and providing of various dynamic user interface and/or electronic communications based on the received electronic data.

The database 106 may be embodied as a data storage device such as a Network Attached Storage (NAS) device or devices, or as a separate database server or servers. The database 106 includes information accessed and stored by the server 104 to facilitate the operations of the yield management system 102. For example, the database 106 may include, without limitation, user account credentials for system administrators, service providers, and consumers, data indicating the services and promotions offered by the promotion and marketing service, electronic marketing information, analytics, reports, financial data, and/or the like.

The consumer devices 110A-110N may be any computing device as known in the art and operated by a consumer. Electronic data received by the server 104 from the consumer devices 110A-110N may be provided in various forms and via various methods. For example, consumer devices 110A-110N may include desktop computers, laptop computers, smartphones, netbooks, tablet computers, wearables, and the like. The information may be provided through various sources on these consumer devices.

In embodiments where a consumer devices 110 is a mobile device, such as a smart phone or tablet, the consumer device 110 may execute an "app" to interact with the yield management system 102. Such apps are typically designed to execute on mobile devices, such as tablets or smartphones. For example, an app may be provided that executes on mobile device operating systems such as Apple Inc.'s iOS®, Google Inc.'s Android®, or Microsoft Inc.'s Windows 10®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications in a manner that allows for improved interactions between apps while also preserving the privacy and security of consumers. In some embodiments, a mobile operating system may also provide for improved communication interfaces for interacting with external devices (e.g., home automation systems, indoor navigation systems, and the like). Communication with hardware and software modules executing outside of the app is typically provided via application programming interfaces (APIs) provided by the mobile device operating system.

The yield management system 102 may leverage the application framework offered by the mobile operating system to allow consumers to designate which information is provided to the app and which may then be provided to the yield management system 102. In some embodiments, consumers may "opt in" to provide particular data to the yield management system 102 in exchange for a benefit, such as improved relevancy of marketing communications offered to the user. In some embodiments, the consumer may be provided with privacy information and other terms and conditions related to the information provided to the yield management system 102 during installation or use of the app. Once the consumer provides access to a particular feature of the mobile device, information derived from that feature may be provided to the yield management system 102 to improve the quality of the consumer's interactions with the promotion and marketing service.

For example, the consumer may indicate that they wish to provide location information to the app from location services circuitry included in their mobile device. Providing this information to the yield management system 102 may enable the yield management system 102 to offer promotions to the consumer that are relevant to the particular location of the consumer (e.g., by providing promotions for merchants proximate to the consumer's current location). It should be appreciated that the various mobile device operating systems may provide the ability to regulate the information provided to the app associated with the yield management system 102. For example, the consumer may decide at a later point to disable the ability of the app to access the location services circuitry, thus limiting the access of the consumer's location information to the yield management system 102.

Various other types of information may also be provided in conjunction with an app executing on the consumer's mobile device. For example, if the mobile device includes a social networking feature, the consumer may enable the app to provide updates to the consumer's social network to notify friends of a particularly interesting promotion. It should be appreciated that the use of mobile technology and associated app frameworks may provide for particularly unique and beneficial uses of the promotion and marketing service through leveraging the functionality offered by the various mobile operating systems.

Additionally or alternatively, the consumer device 110 may interact through the yield management system 102 via a web browser. As yet another example, the consumer device 108 may include various hardware or firmware designed to interface with the yield management system 102 (e.g., where the consumer device 110 is a purpose-built device offered for the primary purpose of communicating with the yield management system 102, such as a store kiosk).

The service provider devices 108A-108N may be any computing device as known in the art and operated by a merchant. For example, the service provider devices 108A-108N may include a merchant point-of-sale, a merchant local marketing device, a merchant e-commerce server, a merchant inventory system, or a computing device accessing a web site designed to provide merchant access (e.g., by accessing a web page via a browser using a set of merchant account credentials). The service provider devices 108A-108N may also be mobile devices as described above with respect to the consumer devices 108A-108N.

Electronic data received by the yield management system 102 from the service provider devices 108A-108N may also be provided in various forms and via various methods. For example, the service provider devices 108A-108N may provide real-time notifications and/or status information as the requested services are assigned, scheduled, completed or the like. In other embodiments, the service provider devices 108A-108N may be employed to provide information to the yield management system 102 to enable the yield management system 102 to generate promotions or other marketing information to be provided to consumers.

Example Apparatus for Implementing Embodiments of the Present Invention

Server 104 may be embodied by one or more computing systems, such as apparatus 200 shown in FIG. 2. As illustrated in FIG. 2, the apparatus 200 may include a processor 202, a memory 204, input/output circuitry 206, communications circuitry 208, data object rendering module 210, data object management module, 212, relevance module 214, and availability management module 216. The apparatus 200 may be configured to execute the operations described above with respect to FIG. 1 and below with respect to FIGS. 3, 4, and 5A-5C. Although these components 202-216 are described with respect to functional limitations, it should be understood that the particular implementations necessarily include the use of particular hardware. It should also be understood that certain of these components 202-216 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 204 may provide storage functionality, the communications circuitry 208 may provide network interface functionality, and the like.

In some embodiments, the processor 202 (and/or coprocessor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the apparatus to carry out various functions in accordance with example embodiments of the present invention.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 204 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display and may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

Data object rendering module 210 includes hardware configured to provide user interface comprised of renderable data objects. The data object rendering module 210 may utilize processing circuitry, such as the processor 202, to perform these actions. The determination module 210 may receive the data via a network interface provided by the communications circuitry 208. However, it should also be appreciated that, in some embodiments, the determination module 210 may include a separate processor, specially configured field programmable gate array (FPGA), or application specific interface circuit (ASIC) to perform the database migration and/or provide database migration framework. The determination module 210 is therefore implemented using hardware components of the apparatus configured by either hardware or software for implementing these planned functions.

Data object management module 212 includes hardware configured to manage, receive, transmit, access, and/or extract any of a plurality of parameters and/or elements associated with a user interface and/or renderable data object. Data object management module 212 may utilize processing circuitry, such as the processor 202, to perform these actions. Data object management module 212 may receive the data via a network interface provided by the communications circuitry 208. However, it should also be appreciated that, in some embodiments, the interaction module 212 may include a separate processor, specially configured field programmable gate array (FPGA), or application specific interface circuit (ASIC) to perform the database migration and/or provide database migration framework. Data object management module 212 is therefore implemented using hardware components of the apparatus configured by either hardware or software for implementing these planned functions.

Relevance module 214 includes hardware configured to calculate, identify, access, or otherwise determine a preferred or optimal value for a particular data element and/or parameter related to a renderable data object. Determination may be based on a classifying model machine learned using historical training data. Relevance module 214 may utilize processing circuitry, such as the processor 202, to perform these actions. The location confirmation module 214 may receive the data via a network interface provided by the communications circuitry 208. However, it should also be appreciated that, in some embodiments, the location confirmation module 214 may include a separate processor, specially configured field programmable gate array (FPGA), or application specific interface circuit (ASIC) to perform the database migration and/or provide database migration framework. The location confirmation module 214 is therefore implemented using hardware components of the apparatus configured by either hardware or software for implementing these planned functions.

Availability management module 216 includes hardware configured to manage, track, determine, identify, access, confirm, update, or otherwise determine the availability of a service, for example, associated with a renderable data object provided via a user interface, in real-time; Relevance module 214 may utilize processing circuitry, such as the processor 202, to perform these actions. The countdown module 216 may receive the data via a network interface provided by the communications circuitry 208. However, it should also be appreciated that, in some embodiments, the countdown module 216 may include a separate processor, specially configured field programmable gate array (FPGA), or application specific interface circuit (ASIC) to perform the database migration and/or provide database migration framework. Relevance module 214 is therefore implemented using hardware components of the apparatus configured by either hardware or software for implementing these planned functions.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by the example displays discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Exemplary Operations for Implementing Embodiments of the Present Invention

In some embodiments, the system may be configured to providing a first dynamic user interface to a first device and a second dynamic user interface to a second device, the first dynamic user interface being different from the second dynamic user interface, and input received at the first dynamic user interface may necessitate and/or cause updating of the second dynamic user interface, and input received at the second dynamic user interface may necessitate and/or cause updating of the first dynamic user interface. FIG. 3 shows exemplary process for providing the first dynamic user interface and the second dynamic user interface. FIG. 3 shows an example method that may be executed by one or more machines, for example by apparatus 200, including determination module 210, interaction module 212, and location confirmation module 214 of FIG. 2, for providing the first dynamic user interface and providing the second dynamic user interface, in accordance with some embodiments discussed herein.

Providing Location-Based and/or Boundary Based Access to Device-Linked Instruments FIG. 3 shows a dataflow diagram of an example processing, which enables input at both a dynamically provided first user interface and a second user interface, which may result in dynamically updating the user interfaces, performed in accordance with some embodiments.

At 305, the system provides a first dynamic user interface to a first device (e.g., a device associated with a service account, operated by the service provider, located at the service provider's place of business, or the like) to each of any number of service providers. The first dynamic user interface may be comprised of a set of renderable data objects. In some embodiments, the set of renderable data objects may be configured to display a calendar, and/or any other configuration showing a time period such as a day, a week, a month and further configured to display segments of the time period. That is, when the renderable data objects display a day, the first dynamic user interface may be configured to display the renderable data objects but to display them in accordance with an adjustable parameter, the adjustable parameter identifying a segment of the time period. For example, the segments of the time period may be 15 minutes, 30 minutes, an hour, two hours, etc. In some embodiments, a plurality of adjustable parameters may used, for example, by the first dynamic user interface in the display the renderable data objects, for example, by providing that portions of the time period may be segmented differently (e.g., at least two of 15 minutes, 30 minutes, an hour, two hours, etc.)

At 310, the yield management system may be configured to receive input regarding, for example, the adjustable parameter(s) (e.g., indicating the segmentation(s) of the time period) and/or a first data element. The first data element may be indicative of, for example, a level of discount applied to a particular service during a particular segment (e.g., 10% off, 25% off, market rate (i.e., 0%)), a binary classification (e.g., peak or off-peak) indicating whether market rates apply to a particular service during a particular segment, etc.

At 315, any input received at the first dynamic user interface may be stored at the system. At 320, the system may be configured to receive a request from a second device (e.g., a consumer device), the request indicative of, for example, the user's desire to schedule an appointment with a service provider for a particular service at a particular time. The request may include one or more of an indication of the particular service, a location of the consumer, a location, locations, and/or region in which the consumer is looking to travel, a time frame (e.g., a particular day, hour, etc.), a particular service provider, or the like.

At 325, the system may be configured to, for example, perform a search for one or more service providers that may be available to provide service to the consumer, access each service provider, or in some embodiments, a particular service provider if included in the request.

At 330, the system may be configured to provide, for display, at the second device, the set of renderable data objects or a subset thereof. For example, in some embodiments, upon determining a particular service provider, and in some instances, a particular service offered by the service provider (to the extent that each service offered by each service provider has a unique set of renderable data objects, adjustable parameters, and data elements), the system may be configured to provide, for display, at the second device, the set of renderable data objects (e.g., in calendar format or the like) with a rendered display of the indication of the first data element (and/or any additional data elements that may be associated with the set of renderable data objects. That is, in some embodiments, the system provides a second dynamic user interface that shows a level of discount associated with each of a plurality of time segments for a particular service at a particular service provider.

At 335, the system may receive a signal indicative of a selection received at the second dynamic user interface, of a particular time segment. That is, the second device (e.g., the consumer's smart phone or the like) may receive a touch input at the display location corresponding to the renderable data object associated with a particular time segment and discount level, resulting in the generation and transmission of a data signal comprising data indicative of the touch and selection.

At 340, the system may programmatically, and in real-time, confirm availability. For example, the yield management system may be configured to confirm availability internally (e.g., by accessing stored information and determining that inventory exists) and/or by transmitting a signal indicative of the selection of the particular time segment and discount level and requesting confirmation of availability. Accordingly, at 345, in parallel with, preceding, subsequent to or instead of step 340, the system may transmit a message indicative of the claim and request confirmation of the service provider's ability and willingness to provide the particular service. At 350, the system may receive confirmation.

At 355, the system may be provided or decrementing availability in those instances in which the system is tracking inventory and/or availability. At 360, the system may be configured for updating any data effected by the claim (e.g., through no additional input from a service provider regarding their availability to provide a service, the system may update parameters associated therewith such that a second request does not lead to double-booking or the like).

At 365, the system may be configured to receive a second request. At 370, the system may be configured to access the updated parameters, and at 375, the system may be configured to provide an updated second dynamic user interface.

FIG. 4 illustrates a flowchart of exemplary operations for a process 400 that may be executed by one or more apparatuses, for example, the server 104 of yield management system 102, to facilitate the maximization of availability capacity, in accordance with some embodiments. As shown in block 405 of FIG. 4, an apparatus, such as apparatus 200, may be configured for providing a first dynamic user interface to a first device and a second dynamic user interface to a second device. The first dynamic user interface is different from the second dynamic user interface. For example, the first dynamic user interface may be configured for display at a device operated by a service provider (e.g., a merchant or the like), and the second dynamic user interface may be configured for display at a device operated by a consumer (e.g., a potential customer of the service provider). In some embodiments, many instances of the first dynamic user interface are provided to each of one or more service providers, and many instances of the second dynamic user interface are provided, for example, to each of one or more devices operated by consumers. Input at an instance of the first dynamic user interface may cause updating, in real-time, of the second dynamic user interface (e.g., where a service provider provides information regarding one or more services they provide or the capacity or inventory thereof). Similarly, in some embodiments, input at an instance of the second dynamic user interface (e.g., requesting a reservation) may cause updating, in real-time, at one or both of an instance of a first dynamic user interface or the system database.

As shown in block 410 of FIG. 4, an apparatus, such as apparatus 200, may be configured for providing, via the first dynamic user interface of the first device, a set of renderable data objects. In some embodiments, each member of the set of renderable data objects associated with an adjustable parameter. The set of renderable data objects take a form of, for example, a calendar and/or schedule. The adjustable parameter may provide information regarding the segmentation of the calendar and/or schedule. That is, in some embodiments, the set of renderable data objects may be configured to show in the form a week's schedule and, the adjustable parameter associated with each member of the set of renderable data objects may provide information causing display of the week's schedule in particular time segments (e.g., morning (e.g., open—noon), mid-day (e.g., 12-2 pm), afternoon (e.g., 2-5 pm), and evening (e.g., 5 pm-close)). As one of ordinary skill in the art would appreciate, the set of renderable objects may be any time period (e.g., a single day, a week, a month, etc.) and the adjustable parameter may be any time segment (e.g., a specific number of minutes, hours, days, etc.).

As shown in block 415 of FIG. 4, an apparatus, such as apparatus 200, may be configured for receiving input, at the first device via the first dynamic user interface, of data indicative of the adjustable parameter and a first data element for each member of the set of renderable data objects, the first data element indicative of a renderable characteristic of each member of the set of renderable data objects. For example, a service provider may input, as described above, data indicating that the adjustable parameters are morning, mid-day, afternoon, and evening, their hours, or the like. In some embodiments, the first element for each member of the set of renderable data objects may be any of a particular price, a discount level, an indication of a class to which the member belongs (e.g., peak, non-peak, etc.).

As shown in block 420 of FIG. 4, an apparatus, such as apparatus 200, may be configured for receiving input, at the first device via the dynamic user interface, of one or more additional data elements including at least a second data element for each member of the set of renderable data objects, the second data element indicative of a renderable characteristic of each member of the set of renderable data objects. For example, a second element may indicative of an available quantity, inventory. That is, a service provider may have ten chairs and as such, may provide information indicating as much. In some embodiments, in addition to or alternatively, the service provider may provide information regarding location, specific employees, service levels, etc.

In some embodiments, a single service provider may be provided with a first dynamic user interface for each service they are able to provide, each location, at which they provide a service, etc. That is, because the adjustable parameter and/or any of the data elements may differ from service to service, location to location, or the like, the yield management system may enable input separately for each service and/or location.

As shown in block 425 of FIG. 4, an apparatus, such as apparatus 200, may be configured for receiving input, from the second device, at the second dynamic user interface, indicative of a request. That is, separate from the input provided from various service providers regarding the various services they may provide, the yield management system provides (e.g., via an app or the like), a second dynamic user interface that is configured to allow consumers to search, identify, and ultimately request reservations for service. Here, a consumer, operating the second device, may, via a search or by navigating directly to a particular service provider's offerings, be provided with the second dynamic user interface.

As shown in block 430 of FIG. 4, an apparatus, such as apparatus 200, may be configured for providing to the second device, via the second dynamic user interface, a subset of the set of renderable data objects and the first data element associated with each member of the subset of the set of renderable data objects, wherein the first data element is configured to display a particular characteristic of an associated member of the set of renderable data objects. For example, the consumer, operating the second device, may indicate the request for a particular time frame (e.g., a day, such as today, tomorrow, etc.) and a particular service, particular service provider, etc. and the yield management system then provides the second dynamic user interface configured to display the requested information. Here, the subset of the set of renderable data objects may relate to the requested time frame (e.g., a single day) whereas the set of renderable data objects is representative of a service provider's entire availability (e.g., the whole week). The second dynamic user interface may also be configured to display the first data element associated with each member of the subset of set of renderable data objects (e.g., showing, for example, the discount level associated with each time of day).

As shown in block 435 of FIG. 4, an apparatus, such as apparatus 200, may be configured for receiving a data signal indicative of user input at the second dynamic user interface indicative of a selection of a particular member of the set of renderable data objects. For example, a consumer may select the renderable data object corresponding to "mid-day" or the like.

As shown in block 440 of FIG. 4, an apparatus, such as apparatus 200, may be configured for any of at least confirming availability, decrementing the second data element quantity parameter, and programmatically, and in real-time, updating at least one of the set of renderable data objects and the first data element. For example, upon receiving a request for an appointment, the system may be configured to access the data server to confirm availability, to generated a notification and transmit the notification to the service provider requesting confirmation, etc. Additionally or alternatively, upon receiving the request, the yield management system may be configured to decrement a quantity or inventory parameter, for example, where the system is maintaining such parameter. In some embodiments, the system may be configured to calculate changes to inventory in real-time based on processed orders.

Additionally or alternatively, the system may be configured for programmatically, in real-time, updating data associated with the set of renderable data objects and the first data element such at a subsequent request from a second consumer is not provided out-of-date information regarding the availability of particular services at a particular service provider. As such, as shown in block 445 of FIG. 4, an apparatus, such as apparatus 200, may be configured for, upon receiving a second request, determining whether an update is required before providing the set of renderable data objects.

In some embodiments, the system may be configured to determine a particular discount level, for example, having real-time relevancy. In some embodiments, for example, before receiving input, at the first device via the first dynamic user interface, indicative of the first data element (e.g., indicative of for example, a discount level or the like), the system may be configured to utilize a relevance module or the like to suggest, recommend, populate, associate, or otherwise determine optimal or preferred discount levels. In some embodiments, the first data element (e.g., indicative of the discount level) may be a dynamic data element, such that, the discount level provided at the second device, via the second dynamic user interface is calculated or otherwise determined, at least in part based on the consumer, or other related information (e.g., time of day, particular geographic location, past purchase history, etc.)

In each of U.S. patent application Ser. No. 13/411,502, filed Mar. 2, 2012, titled "RELEVANCE SYSTEM FOR CONSUMER DEALS", U.S. patent application Ser. No. 13/829,581 entitled "Promotion Offering System" and filed on Mar. 14, 2013, U.S. patent application Ser. No. 12/776,028, now U.S. Pat. No. 8,355,948, titled "SYSTEM AND METHODS FOR DISCOUNT RETAILING" filed on May 7, 2010, each of which is hereby incorporated by reference in its entirety, algorithms are provided for determining relevancy. In particular, the registration process may allow the consumer to search for particular merchants, categories, and/or location that may be of interest. As such, the management and delivery system may be configured such that particular promotions may be offered to consumers based on relevance determinations. For example, U.S. patent application Ser. No. 13/829,581, which is entitled "Promotion Offering System", was filed Mar. 14, 2013, and which is hereby incorporated by reference in its entirety, provides various processes and algorithms for providing consumers relevant promotions in response to consumer action. Additionally or alternatively, relevance may be determined based on information related to promotions that the consumer explicitly selects or searches for, promotions determined to be relevant based on past purchase history, promotions determined to be relevant for any other reasons (e.g., explicitly indicated preferences and profile information, social network statuses and check-ins, searches, click-throughs on displayed ads, etc.).

In other embodiments, the system may utilize a machine learning process for making the determination. That is, in some embodiments, determination may be performed, for example, by machine learning. In particular, an apparatus, such as apparatus 200, may be configured for programmatically determining, for example, an initial value or a default value for the first data element, by applying a classification algorithm. In some embodiments, the classification algorithm may be generated via an unsupervised learning process using values assigned to one or data elements associated with previous rendered data objects.

Once a model has been derived from an initial training data set, the system may be configured to monitor performance of the model and update the training data set so that the model may be adapted incrementally to changes in the behavior of the user. Incremental adaptation of a model reduces the costs involved in repeatedly replacing the model.

Service providers typically offer discounts (e.g., in the form of promotions, deals, rewards or the like) to consumers to generate more business. When offering a discount, a merchant may seek to focus the offer to a specific subset of consumers that may have a higher likelihood of accepting the offering and as such, the system may be configured for dynamically analyzing consumer feedback to offers for promotions. Further description regarding dynamic deal optimization may be found in U.S. application Ser. No. 13/839,360, filed on Jun. 30, 2015, entitled "DYNAMIC PROMOTION ANALYTICS", which is hereby incorporated by reference.

Dynamic change of an adjustable component of a data set may be facilitated using an iterative learning model. Further description regarding dynamic pricing may be found in U.S. application Ser. No. 14/755,742,360, filed on Mar. 15, 2013, entitled "METHOD, APPARATUS, AND COMPUTER PROGRAM PRODUCT FOR FACILITATING DYNAMIC CHANGE OF AN ADJUSTABLE COMPONENT OF A DATA SET", which is hereby incorporated by reference.

Returning to the request received from the second device, via the second identification information, the request may include data indicative of merchant identification information. In some exemplary embodiments, the merchant identification information may be transmitted with the request (i.e. explicitly identifying a particular merchant), while in other embodiments, encoded information may be transmitted as the first element, and the system may decode or otherwise correlate the encoded information to merchant identification information.

The request may also include, additionally or alternatively, at least one of a location or a bounded region (e.g., a boundary of a location), or the like. For example, the request may include data to identify an absolute location of the consumer, via a location service utilizing GPS or the like, connection to a particular WIFI network, or the like. In other embodiments, the may include data indicative of a bounded region, for example, acquired via location services utilizing any of a plurality of geo-fencing techniques (i.e. short-range wireless services). In some embodiments, the system may associate, correlate, or otherwise identify an indication of a particular bounded region to a particular merchant. In some embodiments, the system may be configured for utilizing or otherwise providing location service API to confirm the location.

In some embodiments, the request may also include, for example, a name of one or more merchants, general service information, specific service information, required/requested operating capacity information, required/requested remaining operating capacity information, transactional history information, or the like. The merchant identification information may be any information that could be used to identify a specific merchant or a category of merchants. For example, in some embodiments, merchant identification information may be personal information of a merchant such as name, address, etc., identification number unique to a specific merchant, identification number for a group of merchants, etc.

In some embodiments, each member of the set of renderable data objects may be configured to be modified, via input to the first dynamic user interface, resulting in a modification of the set of adjustable parameters associated with the set of renderable data objects resulting in a new or updated view of the set of renderable data objects. In some embodiments, the system may be configured for, based on where the set of renderable data objects end up at, storing the set of adjustable parameters in a database, for example, for reproducing the most up-to-date rendering of the set of renderable data objects. Accordingly, the system may be configured for accessing the database for the most up-to-date adjustable parameters in order to generate, render, or otherwise cause display of the set of renderable data objects.

FIGS. 5A-5C show example interfaces related to an example use case. FIG. 5A shows an example interface for performing a registration process. As can be seen, the system may be configured for receiving data indicative of each of one or more locations for which the a service provider may wish to utilize the system. For example, as shown, a service provider may choose to utilize the system for three of their five locations. The service provider may register the other locations in a second embodiment. That is, the three selected locations may offer the same of similar services at a same or similar discount level and as such, are bundled in the registration or contract setup shown. Furthermore, the system may be configured for receiving data indicative of each of one or more services which may be offered by the service provider at the selected location and discount levels that may apply to each.

FIG. 5B shows an example interface for receiving, for example, the adjustable parameter (e.g., morning, mid-day, afternoon, and evening) and/or the first data element (e.g., the discount level), which here is a designation of peak or off-peak. For example, a service provider may designate each mid-day as a peak time, whereas each morning and evening may be undesignated or, in other embodiments, designed off-peak. Furthermore, the system may provide a margin, for example, negotiated in advance or set as well as a service fee, or the like.

FIG. 5C shows an example interface for setting the discount level on a per time segment basis (e.g., each member of the set of renderable data objects receives an associated first data element identifying the discount level). For example, as shown in FIG. 5C, for each time segment, a service provider may apply a specific discount level. In some embodiments, discount levels may be based on a maximum tolerance set by the service provider during registration and/or contract creation. Each service offered by a service provider may have, comprise, or otherwise be associated with its own specific time segmentation, discount levels, etc. For example, FIG. 5C shows "17 of 17 services indicating that the particular service provider has 17 services for which are utilizing the system.

FIGS. 3, 4, and 5-A-5C illustrate example flowcharts of the example operations performed by a method, apparatus and computer program product in accordance with an embodiment of the present invention. It will be understood that each block of the flowcharts, and combinations of blocks in the flowcharts, may be implemented by various means, such as hardware, firmware, processor, circuitry and/or other devices associated with execution of software including one or more computer program instructions.

For example, in reference to FIGS. 3, 4, and 5-A-5C, one or more of the procedures described herein may be embodied by computer program instructions. In this regard, the computer program instructions which embody the procedures described above may be stored by a memory 204 of an apparatus employing an embodiment of the present invention and executed by a processor 202 in the apparatus.

As will be appreciated by one of ordinary skill in the art, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIGS. 3, 4, and 5-A-5C when executed, convert a computer or processing circuitry into a particular machine configured to perform an example embodiment of the present invention. Accordingly, the operations of FIGS. 3, 4, and 5-A-5C define an algorithm for configuring a computer or processing to perform an example embodiment. In some cases, a general purpose computer may be provided with an instance of the processor which performs the algorithms of FIGS. 3, 4, and 5-A-5C to transform the general purpose computer into a particular machine configured to perform an example embodiment.

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations herein may be modified or further amplified as described below. Moreover, in some embodiments, additional optional operations may also be included. It should be appreciated that each of the modifications, optional additions or amplifications below may be included with the operations above either alone or in combination with any others among the features described herein.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus for providing, simultaneously, a first dynamic user interface to a first device and a second dynamic user interface to a second device, the first dynamic user interface being different from the second dynamic user interface, wherein input at the first dynamic user interface causes real-time updating of the second dynamic user interface, the apparatus comprising at least one processor and at least one memory including computer program code, the at least one memory and the computer program code configured to, with the processor, cause the apparatus to at least:
provide, via the first dynamic user interface of the first device, a set of renderable data objects, each member of the set of renderable data objects associated with a particular service and an adjustable parameter indicative of a time segment in which the particular service is offered;
determine, via a machine learning process, programmatically determining an initial value for a first data element for each member of the set of renderable data objects, the first data element indicative of a renderable characteristic of each member of the set of renderable data objects by applying a classification algorithm, the classification algorithm generated via an unsupervised learning process using a training data set comprised of values assigned to one or data elements associated with previously rendered data objects;
provide to the second device, via the second dynamic user interface, a subset of the set of renderable data objects and the first data element associated with each member of the subset of the set of renderable data objects, wherein the first data element is configured to display a particular characteristic of an associated member of the set of renderable data objects; and
receive a data signal indicative of user input at the second dynamic user interface indicative of a selection of a particular member of the set of renderable data objects; and
update the training data set to adapt the classification algorithm incrementally.

2. The apparatus according to claim 1, wherein the at least one memory and the computer program code are further configured to, with the processor, cause the apparatus to:
receive input, from the second device, at the second dynamic user interface, indicative of the request for the particular member of the set of renderable data objects; and
in response to receiving the data signal indicative of the selection of the particular member of the set of renderable data objects, programmatically, and in real-time, confirm availability by (1) accessing stored information in the system database and determining that inventory exists, and, in parallel, (2) transmitting a message indicative of the selection of the particular member of the set of renderable data objects to the first device and requesting a confirmation of an ability and willingness to provide the particular service.

3. The apparatus according to claim 1, wherein the at least one memory and the computer program code are further configured to, with the processor, cause the apparatus to:
programmatically, and in real-time, update at least one of the set of renderable data objects and the first data element.

4. The apparatus according to claim 1, wherein the at least one memory and the computer program code are further configured to, with the processor, cause the apparatus to:
receive input, at the first device via the dynamic user interface, of one or more additional data elements including at least a second data element for each member of the set of renderable data objects, the second data element indicative of a renderable characteristic that identifies a quantity of each member of the set of renderable data objects;
subsequent to receiving the signal indicative of the selection at the second dynamic user interface, decrement the second data element; and
upon receiving a second selection for the particular member of the set of renderable data objects, the second request received from a third device via a third dynamic user interface, determine whether an update is required before providing the set of renderable data objects.

5. The apparatus according to claim 1, wherein the at least one memory and the computer program code are further configured to, with the processor, cause the apparatus to:
receive instructions, via input to the first dynamic user interface, to modify at least member of the set of renderable data objects, resulting in a modification of the set of adjustable parameters of the set of renderable data objects and a view of the set of renderable data objects;
based on where the set of renderable data objects end up at, store the set of parameters in a database; and
access the database for the parameters in order to generate the second set of renderable data objects.

6. The apparatus according to claim 1, wherein the at least one memory and the computer program code are further configured to, with the processor, cause the apparatus to:
provide a first subset of renderable data objects upon selection of the particular renderable data object, wherein each element of the first subset of renderable data objects is representative of a type of service able to be requested by the user.

7. The apparatus of claim 2, wherein the at least one memory and the computer program code are further configured to, with the processor, cause the apparatus to:
check for an additional available service provided by the service provider, and for each additional available service, a quantity available for the particular selected timeframe; and
provide a first subset of renderable data objects upon selection of the particular renderable data object, wherein each element of the first subset of renderable data objects is representative of a type of service able to be requested by the user.

8. The apparatus of claim 1, wherein the selection of a particular member of the set of renderable data objects comprises location information.

9. The apparatus of claim 1, wherein the at least one memory and the computer program code are further configured to, with the processor, cause the apparatus to: programmatically determine an initial value for the first data element by applying the classification algorithm.

10. The apparatus of claim 1, wherein the providing of the first dynamic user interface to the first device and the second dynamic user interface to the second device occurs simultaneously, input at the first dynamic user interface causes real-time updating of the second dynamic user interface, and input at the second dynamic user interface causes real-time updating of the first dynamic user interface.

11. A computer program product for providing, simultaneously, a first dynamic user interface to a first device and a second dynamic user interface to a second device, the first dynamic user interface being different from the second dynamic user interface, wherein input at the first dynamic user interface causes real-time updating of the second dynamic user interface, the computer program product comprising at least one non-transitory computer-readable storage medium having computer-executable program code instructions stored therein, the computer-executable program code instructions comprising program code instructions for:
providing, via the first dynamic user interface of the first device, a set of renderable data objects, each member of the set of renderable data objects associated with a particular service and an adjustable parameter indicative of a time segment in which the particular service is offered;
determining, via a machine learning process, programmatically determining an initial value for a first data element for each member of the set of renderable data objects, the first data element indicative of a renderable characteristic of each member of the set of renderable data objects by applying a classification algorithm, the classification algorithm generated via an unsupervised learning process using a training data set comprised of values assigned to one or data elements associated with previously rendered data objects;
providing to the second device, via the second dynamic user interface, a subset of the set of renderable data objects and the first data element associated with each member of the subset of the set of renderable data objects, wherein the first data element is configured to display a particular characteristic of an associated member of the set of renderable data objects; and
receiving a data signal indicative of user input at the second dynamic user interface indicative of a selection of a particular member of the set of renderable data objects; and
updating the training data set to adapt the classification algorithm incrementally.

12. The computer program product according to claim 11, wherein the computer-executable program code instructions further comprise program code instructions for:
receiving input, from the second device, at the second dynamic user interface, indicative of the request for the particular member of the set of renderable data objects; and
in response to receiving the data signal indicative of the selection of the particular member of the set of renderable data objects, programmatically, and in real-time, confirming availability by (1) accessing stored information in the system database and determining that inventory exists, and, in parallel, (2) transmitting a message indicative of the selection of the particular member of the set of renderable data objects to the first device and requesting a confirmation of an ability and willingness to provide the particular service.

13. The computer program product according to claim 11, wherein the computer-executable program code instructions further comprise program code instructions for:
   programmatically, and in real-time, updating at least one of the set of renderable data objects and the first data element.

14. The computer program product according to claim 11, wherein the computer-executable program code instructions further comprise program code instructions for:
   receiving input, at the first device via the dynamic user interface, of one or more additional data elements including at least a second data element for each member of the set of renderable data objects, the second data element indicative of a renderable characteristic that identifies a quantity of each member of the set of renderable data objects;
   subsequent to receiving the signal indicative of the selection at the second dynamic user interface, decrementing the second data element; and
   upon receiving a second selection for the particular member of the set of renderable data objects, the second request received from a third device via a third dynamic user interface, determining whether an update is required before providing the set of renderable data objects.

15. The computer program product according to claim 11, wherein the computer-executable program code instructions further comprise program code instructions for:
   receiving instructions, via input to the first dynamic user interface, to modify at least member of the set of renderable data objects, resulting in a modification of the set of adjustable parameters of the set of renderable data objects and a view of the set of renderable data objects;
   based on where the set of renderable data objects end up at, storing the set of parameters in a database; and
   accessing the database for the parameters in order to generate the second set of renderable data objects.

16. The computer program product according to claim 11, wherein the computer-executable program code instructions further comprise program code instructions for:
   providing a first subset of renderable data objects upon selection of the particular renderable data object, wherein each element of the first subset of renderable data objects is representative of a type of service able to be requested by the user (e.g., haircut, pedicure, etc.).

17. The computer program product of claim 12, wherein the computer-executable program code instructions further comprise program code instructions for:
   checking for an additional available service provided by the service provider, and for each additional available service, a quantity available for the particular selected timeframe; and
   providing a first subset of renderable data objects upon selection of the particular renderable data object, wherein each element of the first subset of renderable data objects is representative of a type of service able to be requested by the user.

18. The computer program product of claim 11, wherein the selection of a particular member of the set of renderable data objects comprises location information.

19. The computer program product of claim 11, wherein the computer-executable program code instructions further comprise program code instructions for:
   programmatically determining an initial value for the first data element by applying the classification algorithm.

20. The computer program product of claim 11, wherein the providing of the first dynamic user interface to the first device and the second dynamic user interface to the second device occurs simultaneously, input at the first dynamic user interface causes real-time updating of the second dynamic user interface, and input at the second dynamic user interface causes real-time updating of the first dynamic user interface.

21. A method for providing, simultaneously, a first dynamic user interface to a first device and a second dynamic user interface to a second device, the first dynamic user interface being different from the second dynamic user interface, wherein input at the first dynamic user interface causes real-time updating of the second dynamic user interface, the method comprising:
   providing, via the first dynamic user interface of the first device, a set of renderable data objects, each member of the set of renderable data objects associated with a particular service and an adjustable parameter indicative of a time segment in which the particular service is offered;
   determining, via a machine learning process, programmatically determining an initial value for a first data element for each member of the set of renderable data objects, the first data element indicative of a renderable characteristic of each member of the set of renderable data objects;
   providing to the second device, via the second dynamic user interface, a subset of the set of renderable data objects and the first data element associated with each member of the subset of the set of renderable data objects, wherein the first data element is configured to display a particular characteristic of an associated member of the set of renderable data objects by applying a classification algorithm, the classification algorithm generated via an unsupervised learning process using a training data set comprised of values assigned to one or data elements associated with previously rendered data objects;
   receiving a data signal indicative of user input at the second dynamic user interface indicative of a selection of a particular member of the set of renderable data objects; and
   updating the training data set to adapt the classification algorithm incrementally.

22. The method according to claim 21, further comprising:
   receiving input, from the second device, at the second dynamic user interface, indicative of the request for the particular member of the set of renderable data objects; and
   in response to receiving the data signal indicative of the selection of the particular member of the set of renderable data objects, programmatically, and in real-time, confirming availability by (1) accessing stored information in the system database and determining that inventory exists, and, in parallel, (2) transmitting a message indicative of the selection of the particular member of the set of renderable data objects to the first device and requesting a confirmation of an ability and willingness to provide the particular service.

23. The method according to claim 21, further comprising:
   programmatically, and in real-time, updating at least one of the set of renderable data objects and the first data element.

24. The method according to claim 21, further comprising:
receiving input, at the first device via the dynamic user interface, of one or more additional data elements including at least a second data element for each member of the set of renderable data objects, the second data element indicative of a renderable characteristic that identifies a quantity of each member of the set of renderable data objects;
subsequent to receiving the signal indicative of the selection at the second dynamic user interface, decrementing the second data element; and
upon receiving a second selection for the particular member of the set of renderable data objects, the second request received from a third device via a third dynamic user interface, determining whether an update is required before providing the set of renderable data objects.

25. The method according to claim 21, the method further comprising:
receiving instructions via input to the first dynamic user interface, to modify at least member of the set of renderable data objects, resulting in a modification of the set of adjustable parameters of the set of renderable data objects and a view of the set of renderable data objects;
based on where the set of renderable data objects end up at, storing the set of parameters in a database; and
accessing the database for the parameters in order to generate the second set of renderable data objects.

26. The method according to claim 21, further comprising:
providing a first subset of renderable data objects upon selection of the particular renderable data object, wherein each element of the first subset of renderable data objects is representative of a type of service able to be requested by the user (e.g., haircut, pedicure, etc.).

27. The method according to claim 22, further comprising:
checking for an additional available service provided by the service provider, and for each additional available service, a quantity available for the particular selected timeframe; and
providing a first subset of renderable data objects upon selection of the particular renderable data object, wherein each element of the first subset of renderable data objects is representative of a type of service able to be requested by the user.

28. The method of claim 21, wherein selection of a particular member of the set of renderable data objects comprises location information.

29. The method of claim 21, further comprising:
programmatically determining an initial value for the first data element by applying the classification algorithm.

30. The method of claim 21, wherein the providing of the first dynamic user interface to the first device and the second dynamic user interface to the second device occurs simultaneously, input at the first dynamic user interface causes real-time updating of the second dynamic user interface, and input at the second dynamic user interface causes real-time updating of the first dynamic user interface.

* * * * *